US008840094B2

(12) United States Patent
Renninger

(10) Patent No.: US 8,840,094 B2
(45) Date of Patent: Sep. 23, 2014

(54) SELF-PUMPING SUSPENSION STRUT

(75) Inventor: Markus Renninger, Oerlenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 225 days.

(21) Appl. No.: 13/641,711

(22) PCT Filed: Apr. 4, 2011

(86) PCT No.: PCT/EP2011/055159
§ 371 (c)(1),
(2), (4) Date: Oct. 17, 2012

(87) PCT Pub. No.: WO2011/147613
PCT Pub. Date: Dec. 1, 2011

(65) Prior Publication Data

US 2013/0049310 A1 Feb. 28, 2013

(30) Foreign Application Priority Data

May 27, 2010 (DE) ......................... 10 2010 029 387
Aug. 28, 2010 (DE) ......................... 10 2010 029 387

(51) Int. Cl.
*F16F 9/14* (2006.01)
*B60G 17/048* (2006.01)
*B60G 17/044* (2006.01)

(52) U.S. Cl.
CPC ............ *B60G 17/044* (2013.01); *B60G 17/048* (2013.01); *B60G 2500/30* (2013.01)
USPC ................... 267/64.17; 188/322.15; 188/315; 188/297; 188/322.22

(58) Field of Classification Search
CPC ............. F16F 9/14; F16F 9/182; B60G 17/00
USPC .......... 188/322.15, 322.13, 322.22, 290, 297, 188/298, 314, 315; 267/64.16, 64.17
See application file for complete search history.

(56) References Cited

U.S. PATENT DOCUMENTS 2,814,482 A * 11/1957 Anderson et al. .......... 267/64.11
2,879,057 A * 3/1959 Heiss ......................... 280/6.159

(Continued)

FOREIGN PATENT DOCUMENTS

DE 10 2008 032 950 B3 2/2010
JP 63 225742 A 9/1988
JP 2001 180244 A 7/2001

OTHER PUBLICATIONS

See International Search Corresponding to PCT/EP2011/055159.

(Continued)

*Primary Examiner* — Melani Torres Williams
(74) *Attorney, Agent, or Firm* — Davis & Bujold, PLLC; Michael J. Bujold

(57) ABSTRACT

A self-pumping suspension strut with internal level regulation, for example for motor vehicles having a fluid-filled working cylinder pressurized with the pressure of the fluid acting as a spring. A hollow piston rod is guided, in a sealed manner, within the working space, into which projects a pump piston attached to the working cylinder. During relative movements between the working cylinder and the piston rod, fluid is delivered from the working space into a pressure chamber in which a pressure is higher than the pressure of the working space. Flow connections between the pressure chamber and the working space selective set a specifiable dynamic level, determined by the extension length of the piston rod, such that the piston rod can be rotated, by a rotating device, for selective cooperation of the axially and the circumferentially spaced flow connections to control flow.

10 Claims, 2 Drawing Sheets

(56) References Cited

U.S. PATENT DOCUMENTS

| | | | | |
|---|---|---|---|---|
| 3,194,547 | A * | 7/1965 | Avner | 267/64.17 |
| 4,469,315 | A * | 9/1984 | Nicholls et al. | 267/64.17 |
| 5,826,863 | A * | 10/1998 | Beck | 267/64.17 |
| 5,941,508 | A * | 8/1999 | Murata et al. | 267/64.17 |
| 6,871,845 | B2 * | 3/2005 | Beck | 267/64.17 |

OTHER PUBLICATIONS

Written Opinion Corresponding to PCT/EP2011/055159.

* cited by examiner

SELF-PUMPING SUSPENSION STRUT

This application is a National Stage completion of PCT/EP2011/055159 filed Apr. 4, 2011, which claims priority from German patent application serial no. 10 2010 029 387.3 filed May 27, 2010 and German patent application serial no 10 2010 029 387.3 filed Aug. 28, 2010.

FIELD OF THE INVENTION

The invention concerns a self-pumping suspension.

BACKGROUND OF THE INVENTION

DE 10 2008 032 950 B3 describes a self-pumping, hydropneumatic suspension strut with internal level regulation, in particular for motor vehicles, which has an oil-filled working cylinder pressurized by the pressure of at least one gas cushion arranged in a high-pressure chamber and acting as a spring, which is divided into two working spaces by a working piston carried by a hollow piston rod, with a piston pump which is driven by spring movement and delivers oil from a low-pressure chamber into the working space connected to the high-pressure chamber, which is provided with a first flow connection that connects the high-pressure chamber to the low-pressure chamber, wherein a further, axially separated second flow connection that can connect the high-pressure chamber to the low-pressure chamber is provided, which can be switched on or off by means of a valve.

By virtue of the two flow connections, the vehicle body of a motor vehicle can be positioned at two different levels, namely a normal level for slow driving and a lower level for driving at high speed. When starting to drive on an uneven road, oil is pumped out of the low-pressure chamber into the high-pressure chamber until a bypass suppresses the work of the pump and thus the level is controlled. The maximum and minimum heights of the vehicle body are determined by the position of the bypass and the outlet openings. If the vehicle is unloaded, the piston rod springs outward, so that the outlet opening that has been freed produces a pressure equalization between the high-pressure and low-pressure chambers. The vehicle body then sinks again to its unladen condition height.

In this known suspension, the strut oil and low-pressure gas cushion are not separated from one another in the low-pressure chamber. Accordingly, this suspension strut can only be used in a mounting position in which the axially movable piston rod projects upward out of the working cylinder. Furthermore, to set different levels, it is necessary to have an external, controllable valve.

SUMMARY OF THE INVENTION

Against that background the purpose of the present invention is to propose a self-pumping suspension arm with internal level regulation, which does not require any external sensors for level adjustment and which can be used in any mounting position.

The invention starts from a self-pumping suspension strut with internal level regulation, for example for motor vehicles, which comprises a fluid-filled working cylinder that is pressurized by the pressure of the fluid acting as a spring, in the working space of which a hollow piston rod is guided in a sealed manner, into which rod a pump piston attached to the working cylinder projects in a sealed manner, so that when relative movement takes place between the working cylinder and the piston rod, fluid is delivered from the working space to a pressure chamber pressurized to a higher fluid pressure than is present in the working space, the strut also having flow connections between the pressure chamber and the working space for selectively setting a specifiable dynamic level determined by the extension length of the piston rod. According to the invention, the suspension strut is characterized in that for the selective co-operation of the axially and circumferentially spaced flow connections, the piston rod can be rotated by a rotating device.

The rotating device can for example be in the form of a hydraulic, pneumatic or electric actuator motor and can be controlled directly by a selector switch operated from the steering wheel or via a level control unit. No additional valves are required for level regulation and the level set by rotating the piston rod is maintained while driving, regardless of the load condition of the vehicle.

The suspension strut according to the invention can contain only gas as the fluid and can operate with or without damping of the movement of the piston rod.

According to an embodiment for at least two height levels, at least two of the flow connections in the piston rod can be in the form of axially and circumferentially spaced bores connected to the working space and at least one flow connection can be in the pump piston in the form of a bore connected to the pressure chamber, which depending on the rotational position of the piston rod, communicate with one another and thereby determine a specifiable level.

A plurality of axially and circumferentially spaced bores can be provided in the piston rod in order to enable corresponding, different height levels to be set. For example, three axially and circumferentially spaced bores can be provided in the piston rod, one of which determines a high level, one a normal level and one a low level.

In another embodiment the flow connection in the piston rod can be in the form of a groove that extends axially and circumferentially, with connection to the working space, and a flow connection in the pump piston can be in the form of a bore connecting to the pressure chamber, by virtue of which continuously variable levels can be set depending on the rotational position of the piston rod.

In an advantageous embodiment the working cylinder can be surrounded by a coaxial outer cylinder. An annular space formed thereby is then divided by a membrane or a separating piston into a pressure-gas-filled equalization space and a hydraulic-fluid-filled equalization space. In this case the hydraulic-fluid-filled equalization space is connected by openings in the working cylinder to the working space filled with hydraulic fluid. Furthermore, it is here provided that the pressure chamber consists of a hydraulic-fluid-filled space connected with ducts or spaces in the pump piston and a high-pressure gas space separated therefrom by a separating piston or a membrane.

In this case the pressure gas in the high-pressure gas space acts on the piston rod indirectly by way of the hydraulic fluid, as also the pressure gas in the equalization space, whereby due to the separation of the pressure-gas-filled spaces from the hydraulic-fluid-filled spaces by membranes or separating pistons, it is ensured that the suspension strut according to the invention can be mounted in the motor vehicle in any desired mounting position.

In a simple manner the pump piston can be made of two coaxial tubes fixed to a common partition wall of the working and outer cylinders, whose annular space is connected by apertures in the partition wall to the fluid space, can be connected via the bore to the flow connections, and is closed at the free end, while its central inside space is connected to the fluid space and to a pump space in the piston rod via a pressure valve that opens toward the fluid space.

The annular space between the outer and inner tubes can be closed in any suitable way, for example by flanging the outer tube inward at its free end while the coaxial inner tube is flanged outward at its free end, and a sealing ring is held by the flanges to form a seal. The flanges can also be in contact, with an annular weld seam joining one to the other to form a seal.

Since the piston rod transfers the spring forces and where appropriate the damping forces as well to the vehicle body, it must be made strong and rigid. Accordingly, the wall thickness of the piston rod is large enough to enable a suction line that communicates with the working space and the pump space via a suction valve that opens into the pump space, to be accommodated in the wall of the piston rod.

In a simple manner the suspension strut according to the invention can be provided with a shock-absorber function if the working space is divided into two parts by a piston attached to the piston rod, which has controllable flow apertures. During the relative movement between the piston rod and the working cylinder, hydraulic fluid is displaced from one side of the piston to the other, and by virtue of the controllable flow apertures in the piston, a different damping effect can be set when bouncing up and down.

BRIEF DESCRIPTION OF THE DRAWINGS

Below, the invention is explained in more detail with reference to two example embodiments illustrated in the drawings, which show.

DETAILED DESCRIPTION OF THE PREFERRED EMBODIMENTS

Figure 1:
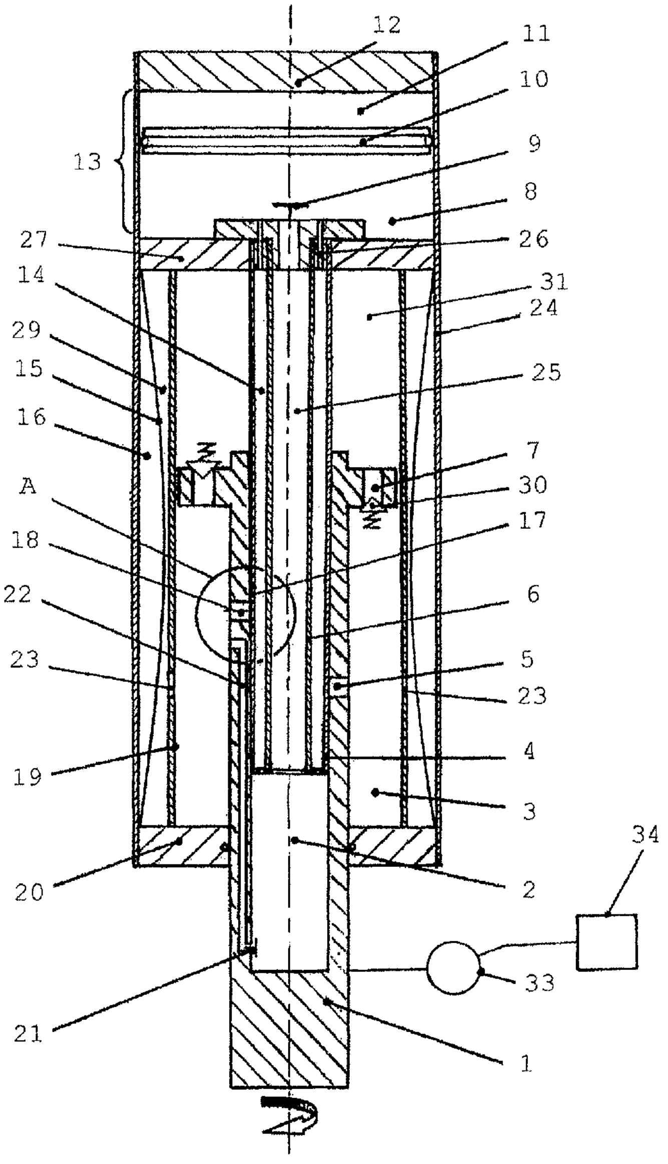
FIG. 1: A schematic sectional view of a first embodiment of a suspension strut according to the invention.

An outer cylinder 24 of the suspension strut according to the invention is attached in a known (not illustrated) manner to a vehicle body (not shown). A piston rod 1 is connected in a known (not illustrated) manner to an axle (not shown) of the vehicle.

The piston rod 1 is guided in a sealed manner through a cover 20, into a working space of a working cylinder 19 which is divided by a piston 7 that is fixed on the end of the piston rod 1 into a lower working space 3 and an upper working space 31. In the piston 7 are arranged one-way valves 30 which bring about different damping of the hydraulic fluid flow from the lower working space 3 into the upper working space 31 and vice-versa when the piston rod 1 with the working piston 7 moves inward and outward while driving.

Into a pump space 2 of the piston rod 1 there projects a pump piston formed of an outer tube 4 and an inner tube 6, which is fitted into the piston rod 1 in a sealing manner. An annular space 14 formed between the outer tube 4 and the inner tube 6 is closed at the free end toward the pump space 2 by an annular plate, and is connected to a fluid space 8 filled with hydraulic fluid via openings 26 in a partition well 27. A central inside space 25 in the inner tube 6 is open to the pump space 2 and can be connected to the fluid space 8 by way of a pressure valve 9 arranged in the wall 27.

In a known manner a high-pressure gas space 11 is separated from the fluid space 8 by a movable separating piston 10 and is closed by an end-plate 12. The fluid space 8, the separating piston 10 and the high-pressure gas space 11 form a high-pressure chamber 13, which is arranged in an outer cylinder 24 that surrounds the working cylinder 19 coaxially.

The noted partition wall 27 separates the fluid space 8 from the upper working space 31 and from a hydraulic-fluid-filled equalization space 29 between the working cylinder 19 and the outer cylinder 24. A gas-filled equalization space 16 in the annular space between the working cylinder 19 and the outer cylinder 24 is separated from the hydraulic-fluid-filled equalization space 29 by a membrane 15. As in the case of the pressure chamber 13, the gas-filled and hydraulic-fluid-filled spaces can be separated by a separating piston, while the separating piston 10 in the pressure chamber 13 can also be replaced by a membrane.

The hydraulic-fluid-filled equalization space 29 is permanently connected to the lower working space 3 by way of openings 23 in the working cylinder 19.

Between the pump space 2 and the working space 3 is arranged a suction line 22, which extends in the wall of the piston rod 1 and which is provided with a suction valve 21 that opens toward the pump space 2. In addition, in the piston rod 1 axially and circumferentially spaced level bores 5 and 18 are provided, of which the level bore 5 determines a lower level setting of the vehicle and the level bore 18 an upper level setting of the vehicle in combination with a control bore 17 arranged in the outer tube 4 of the pump piston.

Depending on the rotational position and movement of the piston rod 1, these bores 5, 17, 18 produce connections between the fluid space 8 pressurized with the high pressure of the gas space 11 and the equalization space 29 by way of the opening 23 and the lower working space 3, so that the hydraulic fluid in the equalization space 29 and hence also in the working spaces 3 and 31, when the bores 5 and 17 or 18 and 17 are not in communication, is under the lower pressure in the gas-filled equalization space 16. In that case the piston rod 1 is acted upon by the pressure in the working spaces 3, 31 and in the equalization space 29, and by the pressure present in the pump space 2.

If the vehicle is loaded, it sinks slightly. In the position shown in FIG. 1 the upper level bore 18 and the control bore 17 then overlap and hydraulic fluid can flow out of the fluid space 8, via the annular space 14 into the working spaces 3, 31 and the equalization space 29. Moreover, hydraulic fluid can also flow via the suction line 22 and the suction valve 21 into the pump space 2, if the pressure in the latter is lower than in the working spaces 3, 31. This increases the pressure in those spaces and the vehicle body is raised relative to the road until there is no longer any overlap between the upper level bore 18 and the control bore 17, so that despite the load, the height level corresponding to the upper level bore 18 is reached again.

During driving, relative movements between the body and the axle of the vehicle take place all the time. If, by virtue of the relative movement, the piston rod 1 is pulled outward from the working spaces 3, 31, hydraulic fluid flows out of the working space 3 via the suction line 22 and the suction valve 21 into the pump space 2. If the piston rod 1 then moves back into the working spaces 3, 31, the hydraulic fluid is displaced through the central inside space 25 in the inner tube 6 and through the pressure valve 9 into the fluid space 8 of the pressure chamber 13. This increases the pressure in the pressure chamber 13 and the pressure in the working spaces 3, 31 decreases. As a result, the force pushing the piston rod outward decreases and the vehicle body moves down slightly.

The control bore 17 and the upper level bore 18 then overlap again and hydraulic fluid can flow back out of the pressure chamber 13 into the working spaces 3, 31. Consequently the vehicle body is raised slightly again and reaches the set body level, which is maintained in this way.

To set a lower level of the vehicle body, piston rod 1 is rotated through 180° by a rotating device 33 (not shown in detail). In the simplest case the rotating device 33 can consist of a manually operated handle on the piston rod 1. Preferably the rotating device 33 is a control motor that can be controlled by a level-regulating unit 34. In that case, to set the desired level a switch for two or more level heights or a rotating knob for the continuous adjustment of different level heights can be provided in the vehicle.

In the example embodiment of FIG. 1 the piston rod 1 is rotated by the rotation device 33 through 180° to reach the lower level. The control bore 17 in the outer tube 4 of the pump piston and the upper level bore 18 can then no longer overlap. By virtue of the relative movement between the piston rod 1 and the working cylinder 19 during driving, hydraulic fluid is drawn out of the working spaces 3, 31 via the suction line 22 and the suction valve 21 and delivered, via the pressure valve 9, into the pressure chamber 13. This reduces the pressure in the working spaces 3, 31 and thus also the force pushing the piston rod out. As a result the vehicle body moves in the direction toward the lower level until the lower level bore 5 and the control bore 17 overlap and form a connection between the pressure chamber 13 and the working spaces 3, 31. The hydraulic fluid flowing into the working spaces 3, 31 in this position prevents any further lowering of the vehicle body and the lower level reached is maintained, just as already described in relation to the high level.

If the vehicle is loaded while at the low level, then level compensation is possible in the same manner as at the high level: the sinking of the vehicle on being loaded leads to an overlap of the lower level bore 5 and the control bore 17, so that hydraulic fluid can flow out of the pressure chamber 13 into the working space 3, 31, whereby the pressure in the working spaces 3, 31 increases and thus also the force pushing the piston rod out, so that the vehicle body is raised until the set low level has been reached again.

Figure 3:
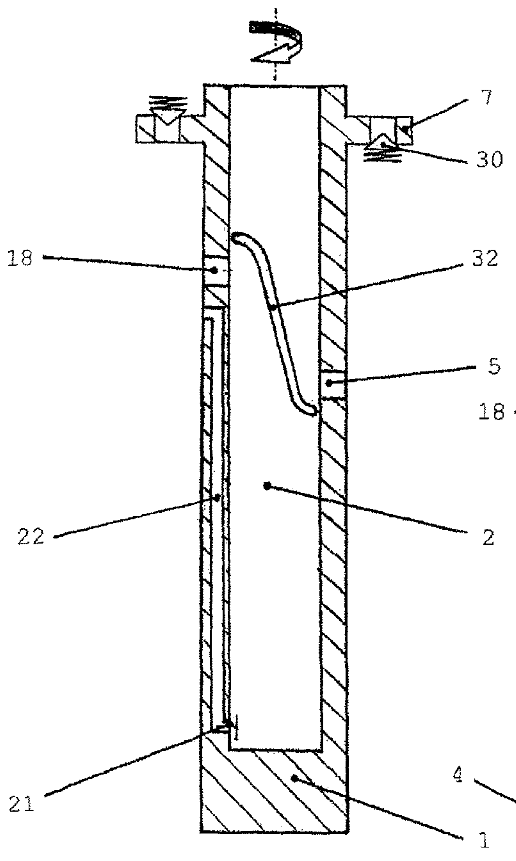
FIG. 3: A schematic sectional view of a piston rod with flow connections, according to a second embodiment.
Figure 2:
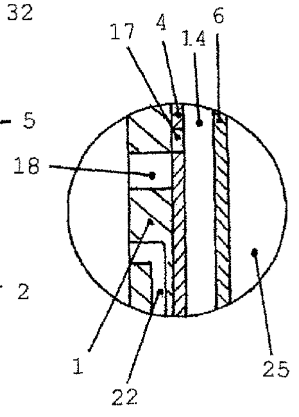
FIG. 2: An enlarged, detail view corresponding to the detail portion A in FIG. 1, showing the flow connections in the piston rod and the pump piston.

In addition to the lower level bore 5 and the upper level bore 18, the example illustrated in FIG. 3 comprises a control groove 32 which enables the vehicle body to be raised from the low level. The control groove 32 passes radially, preferably completely, through the wall of the piston rod 1 in the direction toward the working space 3.

As shown in FIG. 3, the control groove 32 is shaped at its beginning and end with a small inclination and in-between with a constant inclination, so that when the piston rod 1 is rotated, hydraulic fluid can flow out of the pressure chamber 13 into the working spaces 3, 31 thereby increasing the pressure and raising the vehicle.

Accordingly, for smooth adjustment the control groove 32 has small inclinations at its ends and begins below the lower level bore 5 and ends above the upper level bore 18. Starting at the lower level, if the piston rod 1 is rotated through 180° the vehicle body moves to a level position above the high level. If the vehicle is parked in this position it remains at this level position above the high level, which facilitates getting in and out. After driving a certain distance, due to the pump movement, the vehicle reaches the set, somewhat lower high level.

If the piston rod is now rotated through only 90° the vehicle body will move to a level position mid-way between the high level and the low level. It can be seen that by rotation from 0° to 180°, continuous adjustment of intermediate positions between the high and the low levels is possible.

Figure 4:
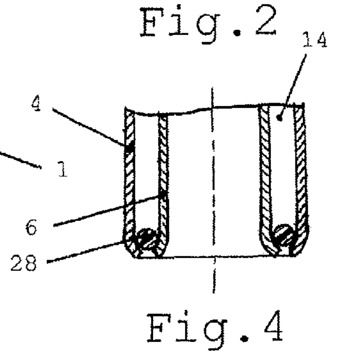
FIG. 4: An enlarged, detail view of the seal at the free end of the pump piston.

FIG. 4 is an enlarged representation showing the sealing of the outer tube 4 relative to the inner tube 6. Whereas in FIG. 1 a seal is formed by an annular plate welded onto the ends of the tubes, FIG. 4 shows a simple seal formed without weld joints: the outer tube 4 is flanged inward at its bottom end while the inner tube 6 is flanged outward at its bottom end. This virtually seals the annular space 14 and a sealing ring 28, which virtually fills the annular space 14, can be inserted and is then pressed against the flanges by the pressure in the pressure chamber 13 to form the seal.

Instead of being formed by an outer tube 4 and an inner tube 6 with an annular space 14 closed at the free end, the pump piston can also be made solid and have a central through-bore between the pressure valve 9 and the pump space 2 and an offset bore extending to the control bore 17.

Compared with the known self-pumping hydro-pneumatic suspension struts, very rapid setting to the high level and level regulation to compensate loading can be achieved. No additional level sensors are needed. Depending on the angular position of the piston rod any desired level positions can be adjusted continuously between upper and lower position limits, and in any level position additional loading is already compensated to the set level.

The principle of the rotating piston-rod for the purpose of setting many different level positions can also be used with automatic level controls of conventional design. These deliver fluid from an unpressurized reservoir to the working space ($P_{wk.spac.} > P_{res}$) otherwise than in the present case in which $P_{wk.spac.} < P_{high\text{-}pressure\ chamber}$.

INDEXES

1 Piston rod
2 Pump space
3 Working space
4 Outer tube
5 Lower level bore
6 Inner tube
7 Working piston
8 Fluid space
9 Pressure valve
10 Separating piston
11 High-pressure gas space
12 End-plate
13 High-pressure chamber
14 Annular space
15 Membrane
16 Gas-filled equalization space
17 Control bore
18 Upper level bore
19 Working cylinder
20 Cover
21 Suction valve
22 Suction line
23 Opening
24 Outer cylinder
25 Central inside space
26 Openings
27 Partition wall
28 Sealing ring
29 Hydraulic-fluid0filled equalization space
30 One-way valves
31 Working space
32 Adjustment groove
33 Rotating device
34 Level control unit

The invention claimed is:

1. A self-pumping suspension strut with internal level regulation, the suspension strut comprising:

a fluid-filled working cylinder (19) being pressurized with a pressure of fluid acting as a spring;

the fluid-filled working cylinder (19) having a working space (3, 31) in which a hollow piston rod (1) being guided in a sealed manner;

a pump piston (4, 6), attached to the working cylinder (19), projecting into the hollow piston rod (1) so that, during relative movement between the working cylinder (19) and the piston rod (1), delivering fluid from the working space (3, 31) into a pressure chamber (13) having a pressure higher than a pressure of the working space (3, 31), the self-pumping suspension strut comprising axially and circumferentially spaced flow connections (5, 17, 18, 32), between the pressure chamber (13) and the working space (3, 31), for the selective setting of a specifiable dynamic level determined by an extension length of the piston rod (1); and the piston rod (1) being rotated, by a rotation device (33), for selective cooperation of the flow connections (5, 17, 18, 32).

2. The suspension strut according to claim 1, wherein at least two of the flow connections are provided in the piston rod (1) as axially and circumferentially spaced bores (5, 18) connected to the working space (3, 31), and at least one flow connection is provided in the pump piston (4, 6) as a bore (17) connected to the pressure chamber (13) which, depending on the rotational position of the piston rod (1), the flow connections communicate with one another and thereby determine a specifiable level.

3. The suspension strut according to claim 1, wherein at least one of the flow connections is provided in the piston rod (1) as a groove (32) extending axially and circumferentially, connected to the working space (3, 31), and another of the flow connections is provided in the pump piston (4, 6) as a bore (17) connected to the pressure chamber (13), which, depending on the rotational position of the piston rod (1), the flow connections communicate with one another and thereby determine a continuously variable level.

4. The suspension strut according to claim 1, wherein the rotation device (33) comprises a servomotor that is controllable by a level control unit (34).

5. The suspension strut according to claim 1, wherein a coaxial outer cylinder (24) surrounds the working cylinder (19) and is spaced therefrom by a distance, an annular space formed therebetween is divided, by one of a membrane (15) and a separating piston, into a pressure-gas-filled equalization space (16) and a hydraulic-fluid-filled equalization space (29), the hydraulic-fluid-filled space (29) is connected, via openings (23) in the working cylinder (19), to the hydraulic-fluid-filled working space (3, 31), and the pressure chamber (13) comprises a fluid space (8) filled with hydraulic fluid and connected to either ducts (14, 25) or spaces in the pump piston (4, 6) and a high-pressure gas space (11) is separated therefrom either by a separating piston (10) or a membrane.

6. The suspension strut according to claim 1, wherein the pump piston comprises two coaxial tubes (4, 6) attached to a common partition wall (27) of the working space (3, 31) and the outer cylinders (19, 24), whose annular space (14) is connected, via apertures (26) in the partition wall (,27) to a fluid space (8) which is connectable, via a bore (17), to the flow connections (5, 18, 32) and is closed at its free end, and whose central inside space (25) is connected to the fluid space (8) and to a pump space (2) in the piston rod (1) by way of a pressure valve (9) that opens into the fluid space (8).

7. The suspension strut according to claim 6, wherein a free end an outer tube (4) is flanged radially inward, and a free end a coaxial inner tube (6) is flanged radially outward, and a sealing ring (28) is retained between the flanges of the inner and the outer tubes and forms a seal.

8. The suspension strut according to claim 6, wherein a suction line (22), arranged in a wall of the piston rod (1), communicates with the working space (3, 31) and the pump space (2) via a suction valve (21) that opens into the pump space (2).

9. The suspension strut according to claim 1, wherein the working space is divided by a piston (7), attached to the piston rod (1) and having controllable through-flow openings, into two working spaces (3, 31).

10. A self-pumping suspension strut with internal level regulation, for motor vehicles, the suspension strut comprising:

a working cylinder (19) defining a working space 3, 31 pressurized by a fluid acting as a spring, a piston having hollow piston rod (1) being sealed within the working cylinder and being slidable along an axis within the working space 3, 31, a pump piston (4, 6) being fixed to the working cylinder (19) and extending coaxially within an interior of the hollow piston rod such that relative movement of the piston, within the working cylinder, displaces the fluid in the working space (3, 31) into a pressure chamber (13), and the pressure chamber having a higher pressure than a pressure in the working space (3, 31); and each of the piston rod and the piston pump comprising flow connections (5, 17, 18, 32), the piston rod being coupled to a rotating device which rotates the piston rod to selectively adjust circumferential alignment of the flow connections of the piston rod with respect to the flow connections of the piston pump so as to form fluid flow paths between the pressure chamber (13) and the working space (3, 31); and axial orientation of the piston rod, with respect to the working cylinder, being adjustable depending on alignment of the flow connections of the piston rod and the piston pump.

* * * * *